June 9, 1964     M. CZUHA, JR., ETAL     3,136,708
METHOD AND APPARATUS FOR MOISTURE DETECTION
Filed July 13, 1961
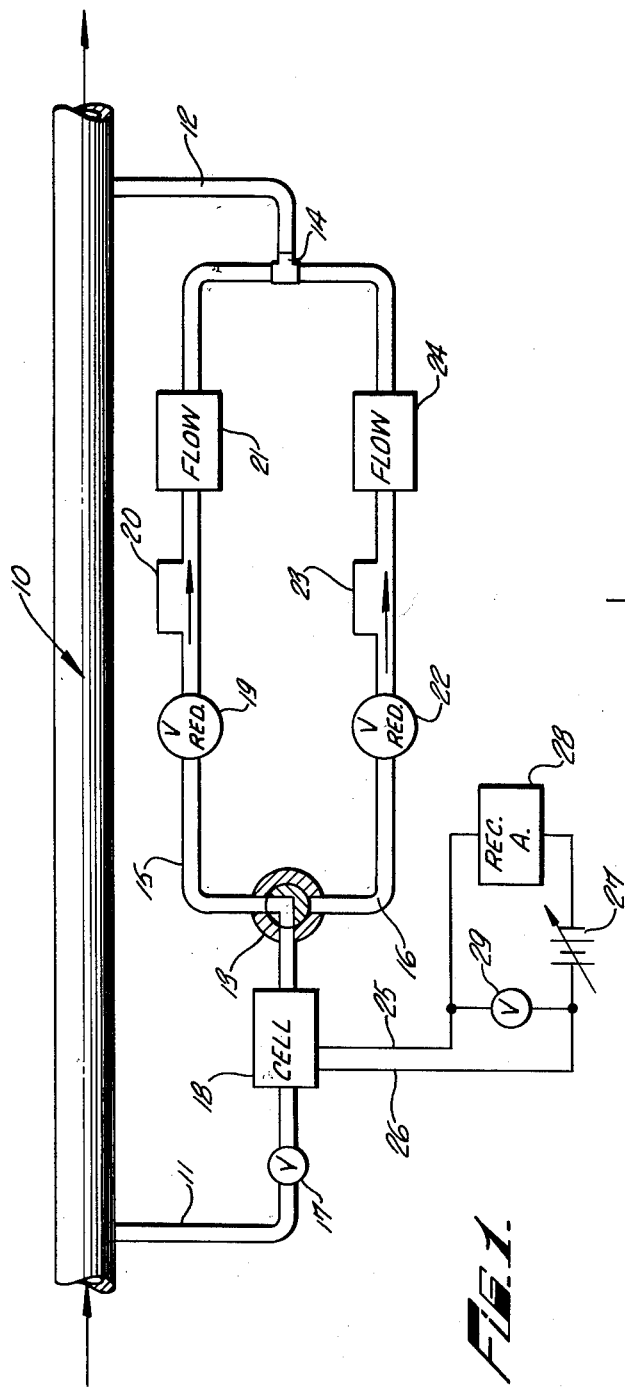
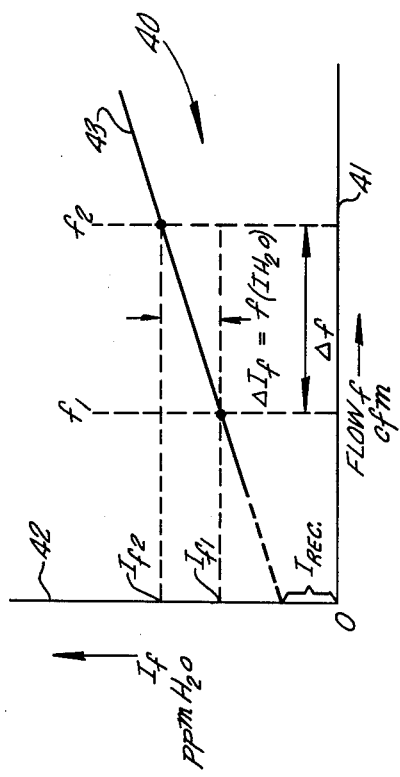
INVENTORS
MICHAEL CZUHA, JR.
CLIFFORD E. BERRY
BY
Christie, Parker & Hale
ATTORNEYS.

United States Patent Office 3,136,708
Patented June 9, 1964

3,136,708
METHOD AND APPARATUS FOR MOISTURE
DETECTION
Michael Czuha, Jr., Temple City, and Clifford E. Berry, Altadena, Calif., assignors to Consolidated Electrodynamics Corporation, Pasadena, Calif., a corporation of California
Filed July 13, 1961, Ser. No. 127,080
7 Claims. (Cl. 204—1)

This invention relates to a method of obtaining indications of moisture in streams of gases and apparatus therefor. More particularly, it relates to an apparatus and method of determining the concentration of moisture in streams of gas having significant percentages by volume of the constituents of water and flowing through hygroscopic electrolytic cells.

This application is a continuation-in-part of copending application "Hydrogen Stream Moisture Detection Method and Apparatus," Serial Number 101,866, filed April 10, 1961, now abandoned, by Michael Czuha, Jr., and Clifford E. Berry and assigned to the assignee of this application.

A typical cell utilized with this invention comprises a pair of spaced bifilar conductive wire electrode coils, the coils being supported against the inside wall of an enclosing tube or housing. A film of hygroscopic material, such as phosphorus pentoxide, is deposited on the coils and housing interior to electrically bridge the spaces between adjacent turns of the two wire helices.

A suitable voltage is applied to the two electrode coils, and when the hygroscopic material is conductive, say upon absorption of moisture, an electrolytic path exists between the alternately spaced turns of the electrode coil. In operation, therefore, as moisture is absorbed by the hygroscopic material from a gas stream flowing past the coils, the hygroscopic material becomes conductive, current flows between the coils in the regions of conductivity and the water is electrolyzed to hydrogen and oxygen. The hygroscopic material is thereby continuously regenerated and the electrical current that flows is an accurate measure of the rate of moisture absorption in accordance with Faraday's law.

Further information on the early theory and construction of these cells may be had by reference to the following United States patents: 2,816,067 to F. A. Keidel on December 10, 1957; 2,830,945 to F. A. Keidel on April 15, 1958; 2,944,957 to F. A. Keidel on July 12, 1960; application of C. E. Berry, S.N. 652,880, filed April 15, 1957, now U.S. Patent No. 2,993,853; and copending application of Michael Czuha, Jr., S.N. 17,698, filed March 25, 1960, now U.S. Patent No. 3,072,556.

When cells of this type, particularly those incorporating phosphorus pentoxide as the electrolyte and platinum wires as the electrodes, are used to obtain indications of moisture level in gaseous streams which do not have hydrogen or oxygen concentrations greater than approximately trace concentrations, it is possible in most applications to obtain the moisture level as a direct function of the current flowing in the cell. The qualification is made because there are instances when the normal gas stream moisture level is very low, say around 20 parts/million of gas, that moisture may be constantly introduced into the system remote from the cell such that the "leakage reading" clouds the validity of the total current reading associated with the cell. The elimination of leakage readings will be discussed later.

It has been observed that when there are high concentrations of the gaseous forms of the constituents of water present in the gas stream to be analyzed, that is, concentration of $H_2$ or $O_2$ greater than about 0.5 part per million, the moisture level as obtained by coulometry is higher than the level as determined by other methods, say psychrometry. It has also been observed that error in moisture determination by coulometry is, in a given electrolytic cell, independent of the rate of gas flow through the cell when and if the actual moisture level in the hydrogen or oxygen containing stream is constant; the absolute error between coulometric moisture determinations and other determinations remains constant as the actual moisture level in the stream increases. Because of these phenomena, and because the magnitudes of these phenomena vary from cell to cell defying accurate and economical calibration of the cells, the application of electrolytic cells commercially has been restricted.

It should be noted that the problems delineated above exist whenever there is more than a trace of molecular hydrogen present in the gas stream; at concentrations corresponding to that in air or lower, the magnitude of the error becomes tolerable in most applications. The same problems exist with oxygen when the oxygen concentration in the gas stream is at or about the same absolute level as produces problems with hydrogen. These same problems exist when hydrogen and oxygen are present together in their molecular forms in a gas stream. In the following explanation, the usual situation will be that the mention of one of the constituents of water is intended to suggest both constituents alternatively and conjunctively.

The inaccurate performance of electrolytic cells when used to determine the moisture level of gas streams rich in hydrogen or oxygen has been recognized for many years. The fact of the spurious reading being independent of gas stream flow rate has been recognized only very recently. It is still more recently that any understanding of the mechaniams producing these erroneous currents has been achieved. But now that the sources of error are known, the errors themselves may be counteracted. This invention provides method and apparatus for electrolytic cells which render the cell useful when the monitored gas stream is rich in hydrogen or oxygen.

The error associated with the presence of hydrogen or oxygen is known as the "water recombination" error. It is thought that the hydrogen in the gas stream recombines with oxygen released by electrolysis after or during the electrolysis of the absorbed gas stream moisture. The same phenomenon occurs between gas stream oxygen and atomic hydrogen released as a product of electrolysis. This recombination, in effect, raises the level of the moisture in the sample and produces the spurious readings associated with the phenomena. Attempts have been made to obviate these errors. One attempt, known as the "short cell," was to reduce the length of the cell so that the recombination could not take place in a degree sufficient to cause a significant error, but the reduction of the cell length also reduced the reliability, sensitivity, and life of the cell.

Generally speaking, this invention provides a method for obtaining accurate measurements of moisture concentration in gaseous samples having a significant percentage by volume of hydrogen and/or oxygen, the constituents of water, through the observation of coulometric current in conjunction with electrolytic cells. For any given gas sample, a measurement of the current flowing in the cell is made at two different rates of flow of the sample through the cell and measurements of the flow rates are also registered. One flow rate is determined relative to the other rate. This relationship is applied as a modifying or weighting factor to the quantitative difference between the observed coulometric currents to provide a coulometric current value directly proportional to the actual moisture concentration present in the gas stream and independent of the water recombination effect.

In terms of apparatus, the invention provides a hygroscopic electrolytic cell connected to a main gas duct by secondary duct means. The secondary duct means includes two alternate gas flow paths, each having means for setting a gas flow therethrough and means for measuring the rate of the gas flow; the gas flow in one of the alternate paths is different from the flow in the other path. Electrical means are provided for impressing a voltage across the cell terminals and for measuring the current flowing in the cell when gas is flowing through the cell from the main duct during one or the other of the alternate secondary duct means gas paths.

The following analysis of the problems obviated by this method and the description of the apparatus on which the method may be practiced are made in conjunction with the following figures, wherein:

FIGURE 1 is an electrical and mechanical schematic of apparatus for use with the method; and FIGURE 2 is a plot of the relationship between gas flow through an electrolytic cell and the coulometric current as a function of moisture level for a hydrogen or oxygen gas sample.

The phenomenon of "water recombination" is considered to be the basis of the erroneous readings of phosphorus pentoxide-platinum electrolytic cells in the presence of hydrogen or oxygen gas streams. While it might seem to be a desirable expedient merely to change the materials of construction of such an apparently troublesome cell, an examination of the comparative life of any other economical groups of materials having the requisite behavior is convincing that phosphorus pentoxide electrolyte and platinum electrodes are highly advantageous. Phosphorus pentoxide is highly hygroscopic and thus is very sensitive to the presence of moisture in a superadjacent gas layer. Also, it does not decompose when subjected to electrolyzing current but instead is regenerated to absorb more moisture. Upon absorption of moisture by such a hygroscopic material, polyphosphoric acid is formed adjacent to the cell electrodes; the relative inertness of platinum to reaction with this acid makes this metal a desirable electrode. However, it is considered that there is a reaction between the phosphorus pentoxide and the platinum during the electrolysis which is responsible for the water recombination leading to cell error when the sampled gas is or contains hydrogen. The water recombination phenomenon associated with an oxygen rich gas stream is related to the catalytic properties of platinum and the chemical activity of atomic hydrogen.

Regardless of the type of gas being sampled by a cell such as that discussed above, the $P_2O_5$ (phosphorus pentoxide) hygroscopic material or electrolyte becomes hydrolyzed into polyphosphoric acid on the absorption of moisture from the gas stream due to the hygroscopic property of $P_2O_5$. A D.C. potential impressed on the electrodes causes a current to flow between the platinum anode and cathode of the cell as the $P_2O_5$ becomes increasingly conductive by increasing hydrolysis. The hydrolysis of the $P_2O_5$ alters the valence bonds between the phosphorus and oxygen atoms as the OH group associates with a P atom and the hydrogen atom associates with an O atom. This valence bond realignment, in conjunction with the statistical migration of hydrogen ions to the negative cathode under the influence of the impressed D.C. potential, contributes to the formation of a complex Pt-O compound at the anode surface as an intermediate compound in a consecutive series of reactions leading to the production of oxygen gas.

Normally the presence of the intermediate does not discernibly affect the cell operation as the hygroscopic material is regenerated (continuous hydrolysis and electrolysis). The usual situation is that oxygen is released at the anode and that the migratory (on a statistical basis) hydrogen ions are released from the cathode into the gas stream after acquiring an electron at the cathode according to coulometric principles; the presence of a non-hydrogen or low-hydrogen flow removes the $H_2$ molecules from the vicinity before any significant reaction can occur between the $H_2$ and the platinum intermediate. However, when there is a hydrogen gas sample flowing in the cell the hydrogen from the sample recombines with the oxides intermediate at the anode to form $H_2O$, which $H_2O$ further participates in the hydrolysis to give an erroneous indication (by means of the coulometric current flow through the cell) of the level of moisture present in the gas sample.

The atomic hydrogen present at the cathode of the cell combines with oxygen from an oxygen rich gas stream to form $H_2O$ which is similarly participant in the continuous hydrolysis and electrolysis within the cell. It has been observed, however, that the magnitude of the error associated with oxygen samples is less than that associated with hydrogen samples. This difference in relative errors is most likely caused by the different reaction rate of the anode and cathode reaction.

Referring to FIGURE 1, there is shown a schematic diagram of the electrical and mechanical system on which the invention is practiced. A duct, pipe, or tube 10 transports a gas stream through a system. A secondary loop to the main duct 10 is formed initially by a pipe or conduit 11 connected to the main gas duct 10 and is closed by a duct 12 joined to the main duct 10 downstream of the loop from duct 11. A parallel flow section is contained in the length of the secondary gas stream. Proceeding in the direction of flow through the secondary loop, duct 11 terminates in a three-way stopcock valve 13 which functions as an "on-off" type of flow regulator as well as a flowmeter selecting switch. The pipe or conduit 12 begins in a three-way T-joint or pipe union 14. A pair of ducts 15 and 16 extend in flow parallel from the flowmeter selecting valve 13 to the T-joint 14. A check valve 17 is provided in duct 11 and is located upstream from an electrolytic cell 18 also installed in the length of duct 11. Duct 15 includes in its length, before rejoining with duct 16 at the T-joint 14, a pressure-reducing valve 19, a pressure-accumulating chamber 20, and a quantitative flowmeter 21. Likewise, the parallel duct 16 of the secondary loop includes a reducing valve 22, a pressure-accumulating chamber 23, and a quantitative flowmeter 24, in serial order.

The electrical circuitry associated with electrolytic cell 18 includes leads or conductors 25 and 26 and the following connected thereto: a variable output direct current (D.C.) power supply 27 and a multi-range recording ammeter 28, in series. A voltmeter 29 is placed in parallel with the power supply 27 and ammeter 28 directly across leads 25 and 26 of cell 18. While the D.C. power supply 27 is shown to be of the variable type, the power supply may be of the constant voltage type without departing from the scope of this invention. Also, recording ammeter 28 may be replaced by a direct reading non-recording ammeter without departing from the scope of this invention.

FIGURE 2 illustrates graphically the water recombination phenomenon as related to an electrolytic cell. The horizontal coordinate or abscissa 41 is associated with the representation for the quantitative flow of the gas through the main duct 10, while the vertical coordinate or ordinate 42 is the scale of the total indicated coulometric current, including the recombination current error, flowing through cell 18. The line 43 of positive slope indicates the relationship between total indicated cell current $I_t$ and flow $f$. While a cell reading at zero flow rate is not indicative of anything (actually it is zero since continued impression of a voltage across conductors 25 and 26 ultimately produces total dehydration of the electrolyte in cell 18 resulting in no current flow) the extrapolation of line 43, as indicated by the dotted extension to the ordinate 42, is an indication of the moisture recombination current $I_{REC}$. As indicated by the general representation of plot 40, the total indicated flow of current $I_f$ in cell 18 is the sum of the recombination current $I_{REC}$ and the moisture current $I_{H_2O}$ associated with the absolute rate of water input, that is:

$$I_f = I_{H_2O} + I_{REC} \tag{1}$$

Recalling that $I_{REC}$ for any given absolute level of moisture in the gas stream of duct 10 has been observed to be constant, a reading of the current in cell 18 at one flow rate of hydrogen or oxygen $f_1$ is $$I_{f_1} = I_{H_2O} + I_{REC_1} \tag{2}$$

Then, if a reading is taken at a second flow rate $f_2$, the total indicated current is $$I_{f_2} = I_{H_2O} + I_{REC_2} \tag{3}$$

This quantity may be represented in the alternative form of Equation four (4):

$$I_{f_2} = \frac{f_2}{f_1} I_{H_2O} + I_{REC_1} \tag{4}$$

When Equations three (3) and four (4) are combined to eliminate the constant $I_{REC}$, the following representation is presented:

$$I_{f_2} - I_{f_1} = I_{H_2O}\left(\frac{f_2}{f_1} - 1\right) \tag{5}$$

or $$\Delta I_f = I_{H_2O}\left(\frac{f_2 - f_1}{f_1}\right) \tag{6}$$

or, alternatively, $$I_{H_2O} = \Delta I_f \left(\frac{f_1}{f_2 - f_1}\right) \tag{1}$$

Thus the difference $\Delta I_f$ in the total observed current readings of cell 18 is established as a function of the absolute moisture level in the gas stream of main duct 10. (An accurate indication of the current flow rate due to gas stream moisture level is thus determined by the difference of the observed current readings as modified or weighted by the ratio of the flow rates corresponding to the observed current readings.) If the ratio of the volumetric flows through cell 18 is 2:1, then the correct moisture content of the gas stream in duct 10 is given directly by the difference in the two readings of total current flow in cell 18. The base flow rate $f_1$ should preferably correspond to the calibrated flow rate of the cell, otherwise a calibration constant must be applied to the resultant indication to provide a truly accurate indication of moisture level. The calibrated flow rate of the cell is the rate of gas flow through the cell at which the relationship of measured electrolysis current to the moisture content of the gas stream in parts per million is determined. This relationship is a function of the physical characteristics of the cell.

Returning to the apparatus shown in FIGURE 1, the function of these elements may be better understood in view of the nature of the process for eliminating the constant source of moisture error as described. The reducing valves 19 and 20 in ducts 15 and 16 are set at two different values to produce two different rates of flow through ducts 15 and 16, respectively. The accumulators 20 and 23 in ducts 15 and 16, respectively, are provided to remove any surges in gas flow which may be reflected from main gas duct 10. Flow meters 21 and 24 in ducts 15 and 16, respectively, are provided so that a highly accurate determination of the flows in the ducts may be determined. The three-way valve 3 is provided as a selector between the ducts 15 and 16.

The recording ammeter 28 provided in the electrical circuitry associated with cell 18 is often more desirable than a nonrecording ammeter. Should any surges in flow through cell 18 be present, the record of the current for any one of the flows through cell 18 provides a means for obtaining a mean or averaged current value so that a more accurate determination may be made.

It was mentioned above that the presence of leakage currents in the cell 18 may be cancelled by the practice of this invention. When the gas stream is rich in molecular hydrogen or oxygen the greatest constant-value source of current error is the water recombination phenomenon discussed in detail above. There are often other constant-value errors in the moisture indication which are independent of the nature of the gas in duct 10. Also, there may be simple electrical leakage currents present which are not associated with electrolysis. In the fabrication of a gas piping system it is common to use rubber or plastic (such as that known commercially as Teflon) seals, gaskets, and O-rings to secure the joints of the systems. These seals may contain moisture when they are installed in the system, or they may absorb moisture from very wet gas streams and then bleed or leak back moisture at a constant rtae to the gas stream at low moisture levels. The leakage of moisture from the seals of the system provides a spurious current reading, albeit of a small value, when it is desired to obtain accurately the moisure content of the gas stream in the main duct 10. Commonly these sources of error are ignored as insignificant. However, when it is desired to obtain an accurate indication of moisture level in a very dry stream of gas, the presence of these leakage values may become highly significant. Since these seals bleed the moisture into the gas stream at a relatively constant rate, the problem is identical to that associated with the water recombination phenomenon, and the method described above for eliminating the recombination current may be utilized.

While there has been described above the practice of this method in conjunction with specific apparatus, this has been largely by way of explanation and illustration only and is not to be considered as a limitation to the scope of this invention.

We claim:
1. A method for measuring the concentration of moisture in gas streams through the use of an electrolytic cell having a pair of electrodes in a hygroscopic material exposed to the gas stream, the method comprising
   (a) establishing a first rate of flow of the gas stream through the cell,
      the gas stream containing at least one of the constituents of water,
   (b) measuring the electrolysis current flow through the cell at the first gas flow rate,
   (c) establishing a second greater rate of flow of the gas stream through the cell,
   (d) measuring the electrolysis current flow through the cell at the second gas flow rate, and
   (e) determining the ratio of the first gas flow rate to the difference in gas flow rates,
      the moisture concentration in the gas stream being coulometrically related to the product of the difference between the measured electrolysis currents and said ratio.

2. A method for accurately determining the moisture content of a quantity of gas by the use of a hygroscopic electrolytic cell comprising the steps of
   (a) supplying a quantity of gas containing at least one of the constituents of water in gaseous form,
   (b) impressing a voltage across the cell,
   (c) establishing a first rate of flow $f_1$ of a portion of the gas through the cell, (d) measuring the electrical current flow in the cell when gas flows through the cell at the first gas flow rate, (e) establishing a second rate of flow $f_2$ of a second portion of the gas through the cell, (f) measuring the electrical current flow in the cell when gas flows through the cell at the second gas flow rate, and (g) determining the value of the relationship $f_1/(f_2-f_1)$, the moisture content of the gas stream being coulometrically related to the difference between the current flows measured in steps (d) and (f) multiplied by the value of said relationship.

3. A method according to claim 1 wherein the second flow rate is twice the first flow rate whereby the indication of moisture level is the difference in the observed current readings.

4. A method according to claim 1 wherein the first flow rate is the calibrated flow rate of the cell.

5. Apparatus for determining the concentration of moisture in gas streams including at least one of the constituents of water comprising an electrolytic moisture analysis cell having spaced apart electrodes, a hygroscopic solid electrolyte bridging the electrodes and means supplying a D.C. voltage to the electrodes, a main gas duct, associate duct means connected between the main duct and the cell for passing a portion of the gas from the main duct through the cell, means associated with the associate duct means for providing two separate gas flow rates through the cell, means for measuring the value of the two flow rates, and means for measuring the current flowing in the cell at the two different flow rates.

6. Apparatus in accordance with claim 5 including means for providing steady flow of gas through the cell at the two flow rates.

7. Apparatus for accurately determining the amount of moisture present in a gas stream which has a constituent at least one of the components of water, the apparatus comprising:

(a) a main duct through which the gas stream flows, (b) a bypass conduit connected to the main duct at an inlet and at an outlet, (c) a pair of secondary ducts connected in parallel gas flow relation in the by-pass conduit, each secondary duct including (1) a flow regulating means for providing a preset gas flow rate through the secondary duct, (d) selectively operable valve means in the by-pass conduit for determining the fluid flow relation of the secondary ducts to the by-pass conduit for gas flow from the by-pass conduit through the secondary ducts, (e) a hygroscopic electrolytic cell in the by-pass conduit between the inlet and the valve means, (f) means for impressing a D.C. potential across the cell, and (g) means for indicating the electric current flow through the cell.

References Cited in the file of this patent
UNITED STATES PATENTS

| | | |
|---|---|---|
| 2,830,945 | Keidel | Apr. 15, 1958 |
| 2,900,317 | Keidel | Aug. 18, 1959 |
| 2,934,693 | Reinecke et al. | Apr. 26, 1960 |